(12) United States Patent
Tenorio

(10) Patent No.: US 6,778,991 B2
(45) Date of Patent: Aug. 17, 2004

(54) DYNAMIC LOAD BALANCING USING SEMANTIC TRAFFIC MONITORING

(75) Inventor: Manoel Tenorio, Mountain View, CA (US)

(73) Assignee: i2 Technologies US, Inc., Dallas, TX (US)

(*) Notice: Subject to any disclaimer, the term of this patent is extended or adjusted under 35 U.S.C. 154(b) by 293 days.

(21) Appl. No.: 10/037,695

(22) Filed: Oct. 19, 2001

(65) Prior Publication Data
US 2003/0059030 A1 Mar. 27, 2003

Related U.S. Application Data
(60) Provisional application No. 60/326,061, filed on Sep. 27, 2001.

(51) Int. Cl.[7] .............................................. G06F 17/30
(52) U.S. Cl. .......................... 707/10; 709/217; 709/235
(58) Field of Search ........................... 707/10; 709/203, 709/217, 224, 235

(56) References Cited

U.S. PATENT DOCUMENTS 5,675,791 A * 10/1997 Bhide et al. ................. 707/205
6,473,791 B1 * 10/2002 Al-Ghosein et al. ......... 709/217
6,484,143 B1 * 11/2002 Swildens et al. .............. 705/1
2002/0095301 A1 * 7/2002 Villena .......................... 705/1

FOREIGN PATENT DOCUMENTS

EP        1 056 024 A1    11/2000    ........... G06F/17/30

OTHER PUBLICATIONS

Carey, M. J. and Lu, H. Load Balancing in a Locally Distributed Database System ACM SIGMOD Record, Jun. 1986, vol. 15, Issue 2, PP 108–119.*

* cited by examiner

Primary Examiner—Jack Choules
(74) Attorney, Agent, or Firm—Baker Botts L.L.P.

(57) ABSTRACT

An electronic commerce system includes one or more product databases that store product data for a plurality of products. The system includes a global content directory that includes a plurality of product classes organized in a hierarchy. Each product class categorizes a number of products and is associated with one or more attributes of the products categorized in the product class. At least one of the product classes has one or more associated pointers that identify one or more of the product databases. The system further includes a search interface that communicates a search query to the product databases to search for product data stored in the product databases identified by one of the pointers. The system also includes a traffic module operable to monitor the traffic levels associated with each product class and dynamically balance searches on the product databases based on the traffic levels.

33 Claims, 3 Drawing Sheets

DYNAMIC LOAD BALANCING USING SEMANTIC TRAFFIC MONITORING

This application claims the benefit of Provisional application No. 60/326,061, filed Sep. 27, 2001.

BACKGROUND OF THE INVENTION

Due to the ever-increasing popularity and accessibility of the Internet as a medium of communication, the number of business transactions conducted using the Internet is also increasing, as is the numbers of buyers and sellers participating in electronic marketplaces providing a forum for these transactions. In addition, the number of potential buyers looking for information regarding different products and services and the number of Internet users merely seeking information for various products is also increasing. Before buyers become ready to begin a business transaction, most buyers desire to learn more about the products they are interested in and therefore seek ways to gather information and details regarding the products. Accessing the necessary product information can be a frustrating and time-consuming ordeal for popular products sought by many different buyers and users and in times of the day having high traffic for the Internet when bandwidth becomes taxed. Often when a user cannot access the desired product information, the user will become frustrated, give up, no longer seek the product information, and perhaps decide not to purchase any products since no information can be obtained about the products. If the user does not give up, then locating the desired product information may take longer than necessary and result in an inefficient process where the user spends too much time and money searching for product information.

SUMMARY OF THE INVENTION

According to the present invention, disadvantages and problems associated with previous e-commerce techniques have been substantially reduced or eliminated.

In one embodiment of the present invention, one or more product databases store product data for a plurality of products. The system also includes a global content directory that includes a plurality of product classes organized in a hierarchy. Each product class categorizes a number of products and is associated with one or more attributes of the products categorized in the product class. At least one of the product classes has one or more associated pointers that identify the product databases. The system further includes a search interface that communicates a search query to the product databases to search the product data stored in the product databases identified by one of the pointers. The system also includes a traffic module that monitors the traffic levels associated with each of the product classes and dynamically balances searches of the product databases based on the traffic levels.

Particular embodiments of the present invention may provide one or more technical advantages. For example, certain embodiments of the present invention provide one or more product databases with each product database storing the same product data. The use of one or more product databases storing the same product data increases the speed of data retrieval and prevents bottle-necks at the product databases experiencing high bandwidth traffic. The pointers associated with the product classes identify which product databases are searched to locate the desired product data. Because the product databases contain the same product data, the pointers may be rearranged when a particular product class experiences heavy traffic so that the bandwidth traffic for the product class is spread across more than one product database. Therefore, rearranging the associated pointers identifying the product data to more than one product database eliminates a bottle-neck at the product database associated with the product classes experiencing high bandwidth traffic. In addition, the speed of retrieval for product data increases because the product data is more localized in the product databases. Associated pointers for the product classes identify particular product data within the product databases. Each product database only provides a certain kind of product data instead of each product database providing all the product data to the product classes and users of the e-commerce transaction system. Therefore, the accessible product data is not spread out across all the product databases. The localized product data allows for product data used and reused to be stored in volatile memory, such as cache memory, which allows for quicker access and the increase in the speed for product data retrieval.

Furthermore, particular embodiments of the present invention also allow for the dynamic balancing of the load across the product databases without using predictive algorithms thereby allowing load rebalancing that is on target and more responsive to current situations. The load across the product databases is balanced using the actual current traffic levels in the product classes instead of traffic value estimates derived from estimating or guessing as to what the traffic levels will be based on a set of given parameters. No time or money is expended in faulty load predictions and because the load on the product databases is calculated throughout the day using actual current traffic levels, response to any bottle-necks that develop may be made immediately and therefore result in no slowdown of the e-commerce transaction system. Other technical advantages may be readily apparent to those skilled in the art from the figures, description, and claims included herein.

BRIEF DESCRIPTION OF THE DRAWINGS

To provide a more complete understanding of the present invention and the features and advantages thereof, reference is made to the following description taken in conjunction with the accompanying drawings, in which.

DETAILED DESCRIPTION OF EXAMPLE EMBODIMENTS

Figure 1:
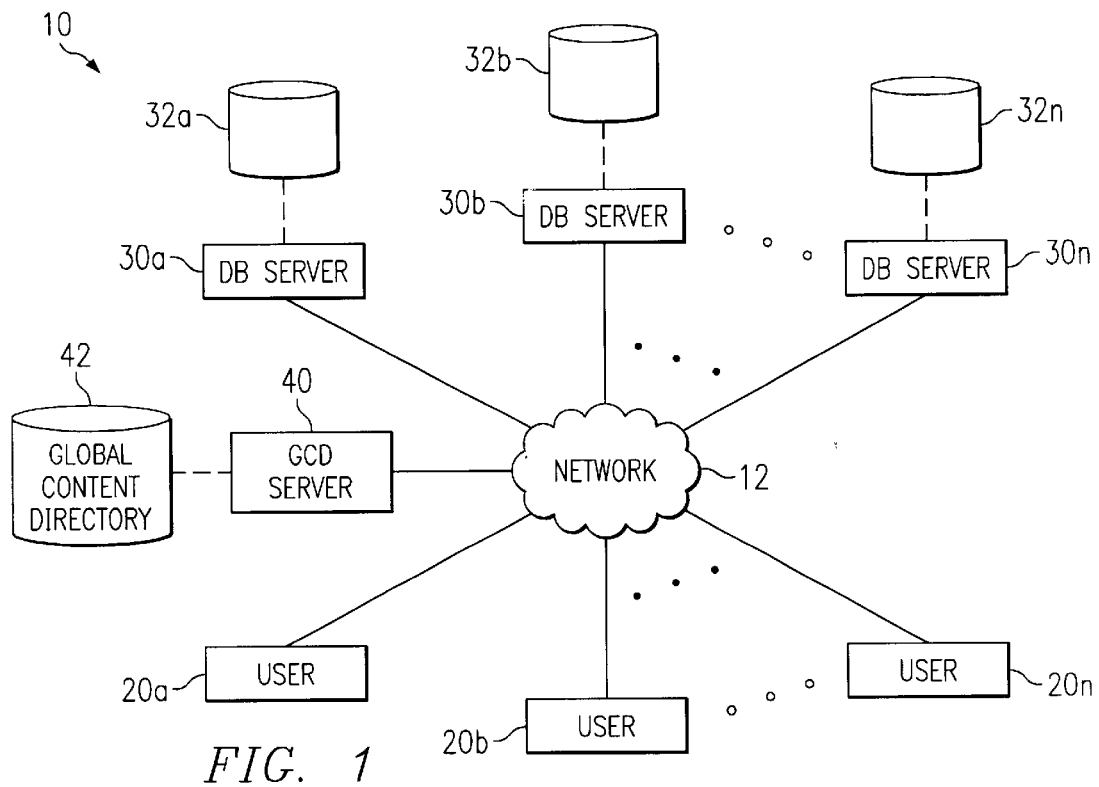
FIG. 1 illustrates an example electronic commerce system.

FIG. 1 illustrates an example system 10 that includes a network 12 coupling users 20, product databases 32, and a global content directory (GCD) server 40. System 10 enables electronic commerce ("e-commerce") transactions and allows users 20 to search for and locate product data for a plurality of products through the use of a GCD 42 supported by GCD server 40. GCD 42 may be internal or external to GCD server 40. Network 12 may include any appropriate combination of public and/or private networks coupling buyers 20, product databases 32, and GCD server 40. In an example embodiment, network 12 includes the Internet and any appropriate local area networks (LANs), metropolitan area networks (MANs), or wide area networks (WANs) coupling buyers 20, product databases 32, and GCD server 40 to the Internet. Since the Internet is accessible to the vast majority of users in the world, the present invention potentially includes all of these users as users 20 associated with system 10. However, the use of the term "global" should not be interpreted as a geographic limitation necessarily requiring that GCD 42 provide directory services to users 20 around the world (or in any other particular region) or that the content of GCD 42 be from all over the world (or from any other particular region).

Reference to "user" is meant to include a person, a computer system, an organization, or another entity where appropriate. For example, a user 20 may include a computer programmed to autonomously identify a need for a product, search for that product, and buy that product upon identifying a suitable seller. Although searching for and locating product data are primarily described herein, the present invention contemplates any appropriate e-commerce transaction. Moreover, reference to "products" is meant to include goods, real property, services, information, or any other suitable tangible or intangible things.

A typical e-commerce transaction may involve a "matching" phase and a "transactional" phase. During the matching phase, a user 20 may search for a suitable product (meaning any good, real property, service, information, or other tangible or intangible thing that may be the subject of an e-commerce transaction) offered by one or more sellers, using specific product data search criteria to locate a suitable product. Once a user 20 has located a suitable product, user 20 may identify the most suitable seller (which may involve, for example, identifying the seller offering the lowest price), and contact that seller to enter the transactional phase. During the transactional phase, the user 20 and seller may negotiate a contract for the sale of the product (which may involve, for example, more clearly defining the subject of the transaction, negotiating a price, and reaching an agreement on supply logistics) and generate a legal document embodying the terms of the negotiated contract. To identify the most suitable product during the matching phase without the use of GCD 42, a user 20 may have to access numerous product and/or seller web sites to determine which product offers the certain desired features desired by user 20. Product manufacturers, consumer organizations, business organizations, and/or sellers may each provide one or more product databases 32, such as relational databases, that include product data identifying the available products and the product features. Each product database 32 may be accessed through the associated manufacturers', consumer organizations', business organizations', and/or sellers' web site or in any other appropriate manner. The multiple one-to-one (one user 20 to one manufacturer, consumer or business organization, or seller) searches that this process requires are inefficient and expensive because of the large amount of searching involved in finding a product and because the various offerings of that product may not be easily compared.

Alternatively, multiple sellers and/or manufacturers may be grouped in an electronic marketplace according to the products they provide and a user 20 may search the offerings of the multiple sellers and/or manufacturers at a single web site. However, if user 20 wishes to obtain several different types of products, user 20 may have to go to several different types of marketplaces. Furthermore, there may be numerous competing marketplaces that user 20 has to search to perform the matching phase of a transaction for a particular product. One potential method of addressing this problem is to create a global product database that potentially includes data identifying the features of all the products that any user may wish to obtain. Therefore, the global database would include the combined contents of every product database 32 associated with every product. However, such a global database would have many problems. For example, the sheer size of the database would make it difficult to search and thus the database would suffer from performance problems. In addition, it would be difficult to allow large numbers of users 20 to search the database at once. Furthermore, bottlenecks may occur in the database for very popular products or during high bandwidth traffic periods which would slow down users 20 searching of the database. Many other problems might also exist.

A solution to the above problems, at least in part, is GCD 42. GCD 42 is a universal directory of the contents of multiple product databases 32 (and potentially all product databases 32). GCD 42 may be implemented using one or more servers 40 or other computers located at one or more locations. Most or all of the content in these product databases 32 remains stored in product databases 32, but this content is accessible using GCD 42. Therefore, like the global database described above, GCD 42 provides users 20 with access to product data relating to a multitude of products (and potentially seller data relating to one or more sellers of the products), but unlike the global database, GCD 42 does not attempt to store and access all of this product data in one enormous database. One or more database servers 30 associated with product databases 32 facilitate the classification and retrieval of product data by GCD 42. Where appropriate, reference to "data" is meant to include product data (meaning information reflecting values for certain attributes of a product), seller data (meaning information reflecting values for certain seller attributes), or both product data and seller data.

GCD 42 provides a directory of products using a directory structure in which products are organized using a hierarchical classification system. A user 20 may navigate or search the directory to find a particular product class into which products are categorized. The product data (and potentially seller data) associated with a product included in a product class may actually be stored in and obtained by GCD 42 from a product database 32. However, the requested data may be transparently provided to user 20 such that all of the product data may appear to user 20 as being included in GCD 42. Although product and/or seller data has primarily been described as being stored in product databases 32, the present invention contemplates product data being stored in any suitable manner and being retrieved from any suitable sources.

Figure 2:
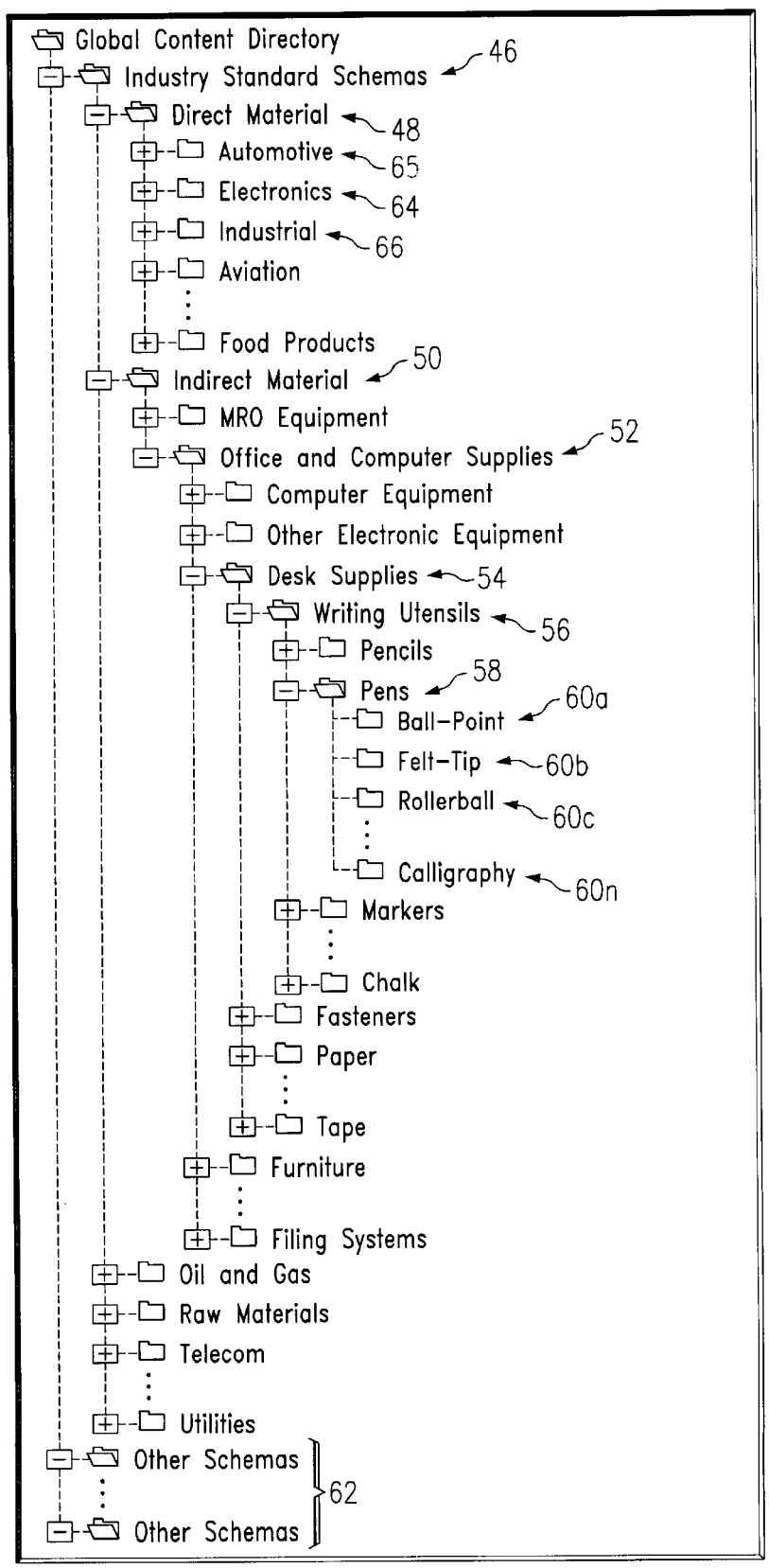
FIG. 2 illustrates an example directory structure of an example global content directory.

FIG. 2 illustrates an example directory structure 44 of an example GCD 42. Products categorized in GCD 42 may be organized according to schemas. A schema may include a set of product classes (which may be referred to as a "taxonomy") organized in a hierarchy, each class being associated with a set of product features, characteristics, or other product attributes (which may be referred to as a "product ontology"). For example, pens may have different kinds of tips (such as ball point or felt tip), different tip sizes (such as fine, medium, or broad), and different ink colors (such as blue, black, or red). Accordingly, a schema may include a class corresponding to pens that has a product ontology including tip type, tip size, and color, or other appropriate attributes. Within a class, products may be defined by product attribute values (such as, for example, ball point, medium tip, blue ink). Reference to "value" is meant to include any appropriate data reflecting an instance of a product attribute or a seller attribute. Product attribute values and seller attribute values may include numbers, letters, figures, characters, symbols, or other suitable information for describing a product or a seller, respectively. In one embodiment, a product ontology may be divided into entry-required attributes (meaning attributes for which a value has to be provided) and entry-optional attributes (meaning attributes for which a value is optional), and these categories may be further divided into commercial features and design features (or any other suitable divisions).

In addition to a taxonomy and product ontologies, a schema may include a set of attributes for each seller (which may be referred to as a "seller ontology"). Such attributes may include geographic restrictions (such as served markets), currencies accepted by each seller, collaboration tools accepted by each seller, contract terms accepted by each seller, types of contracts accepted by each seller, levels of buyer credit required by each seller, and any other suitable seller attributes. Similar to a products within a product class, sellers offering products within a product class may be defined by seller attribute values corresponding to seller attributes. Accordingly, a schema may include a set of classes, each including one or more products, and each class may be associated with a set of product attributes and a set of seller attributes.

In example directory structure 44, products may be organized and cataloged according to industry standard schemas 46 or other appropriate schemas, as described below. Within industry standard schemas 46, there are two example classes: a direct materials class 48 and an indirect materials class 50. Each of these classes 48 and 50 includes several sub-classes (which may themselves include sub-classes). Therefore, the numerous classes of directory structure 44 form a "tree-like" hierarchical structure into which products may be categorized. For example purposes, certain portions of directory structure 44 are "expanded" in FIG. 2 to show various levels of classes. The "level" of a class is indicated by the number of other classes between that class and a root class (such as industry standard schemas class 46). For example, indirect material class 50 is at the same level in directory structure as direct material class 48. Indirect material class 50 may include an office and computer supplies class 52, which includes a desk supplies class 54, which includes a writing utensils class 56. Furthermore, writing utensils class 56 includes a pens class 58, which includes numerous pen type classes 60a–60n ("n" indicating that any number of classes 60 may be included in pens class 58). Each of classes 50, 52, 54, 56, 58, and 60 is located at a different level of directory structure 44. A class at any level in directory structure 44 may include one or more sub-classes, those sub-classes may include one or more subclasses, and so on until a desired specificity of categorization is reached. A series of classes from a highest level class (the broadest class) to a lowest level class (the most specific class) may be referred to as a "branch" of directory structure 44. For example, classes 46, 48, 50, 52, 54, 56, 58, and 60b form one branch of directory structure 44.

Although example directory structure 44 may use industry standard schemas 46 as described above, any other appropriate schemas 62 may be used in addition to or instead of industry standard schemas 46. For example, while industry standard schemas 46 may be organized from a seller's viewpoint, other schemas 62 may be used that organize products from a user's viewpoint. For example, a user 20 may wish to furnish a kitchen of a new house with various products, such as appliances, window treatments, paint, cabinetry, plumbing, dishes, and cooking utensils. Using one schema 62, these products may be organized into a variety of unrelated classes based on certain features of the products (for example, certain kitchen appliances may be categorized in an electronics class 64 of directory structure 44 while paint may be categorized into an industrial class 66). However, another example schema 62 may categorize all such products into a home products class (which may include several classes further categorizing the products, such as a kitchen products class which includes a kitchen appliances class, which includes a refrigerator class, and so on). Therefore, the same product may be included in multiple schemas 62. These alternative schemas may be included in directory structure 44 and may be stored as a part of or separate from GCD 42.

A user 20 may navigate through directory structure 44 by expanding or collapsing various classes as desired. For example, FIG. 2 illustrates an expansion of certain classes of directory structure 44 to reach a felt-tip pen class 60b. Once a user 20 has navigated to a class that is specific enough for user 20 (and/or a class that is at the end of a branch), user 20 may perform a search for products within that class. For example, user 20 can search for all products in writing utensils class 56 that are blue felt-tip pens having medium tips. Alternatively, if user 20 navigates to the end of a branch of directory structure 44, such as felt-tip pen class 60b, GCD 42 may then enable user 20 to search for such pens that have blue ink and medium tips (which may reach the same result as the search above).

User 20 may also search for sellers matching one or more seller attribute values within a product class. For example, in addition to searching for all products in writing utensils class 56 that are blue felt-tip pins having medium tips, user 20 may search for sellers serving Texas that accept U.S. dollars. User 20 may search for products matching certain product attribute values and sellers matching certain seller attribute values in any appropriate manner. In one embodiment, for example, user 20 provides search criteria including both values for product attributes and for seller attributes (search criteria may instead be generated automatically, in whole or in part, as described below), and server 40 searches for products that match the product attribute criteria and are offered by sellers matching the seller attribute criteria.

As described above, in one embodiment product data (at least product data more detailed than data provided by a taxonomy) and seller data are not stored in GCD 42, but are stored in product databases 32. For example, product manufacturers and sellers may maintain product data that is ported into relational databases 32 that include a plurality of tables containing product attribute values for a variety of products and seller attribute values for each product, a set of products, or all of the products offered by the manufactures and sellers. Product data and seller data may be integrated into one or more tables or may be segregated into different tables. One or more pointers may be associated with each product class to identify the location of one or more product databases 32 that include product data and/or seller data for products contained in that class or to identify particular data in product databases 32. Therefore, GCD 42 may execute a search for products in product databases 32 identified by a pointer corresponding to a user-selected (or automatically selected) class. GCD 42 may also return the network location (such as a uniform resource locator (URL) or other network address) of the product database 32 to user 20 so that user 20 may independently access product database 32. Product databases 32 may be searched using any appropriate method including, but not limited to, a structured query language (SQL) query.

GCD 42 may be implemented using the lightweight directory access protocol (LDAP), which enables directories to be provided using the tree-like structure described above. However, any other appropriate technique or protocol for creating GCD 42 may alternatively be used and GCD 42 may have any appropriate structure. Furthermore, GCD 42 may be an object-oriented directory (which is also provided by LDAP) such that each class in directory structure 44 includes the attributes of parent classes in which the class is a sub-class. In this embodiment, a product class listed at the end of a branch of the tree structure includes all of the attributes of its parent classes in the branch. Furthermore, each product included in a product database 32 may be an object that includes all the attributes of the classes in which the product is included. Thus, when a search is performed from a class at the end of a branch of directory structure 44, the search query may automatically include any appropriate attributes of parent classes of the class.

For example, if a user 20 has navigated through directory structure 44 to felt-tip pens class 60*b*, a search performed by user 20 (or by GCD 42 on behalf of user 20) from felt-tip pens class 60*b* may automatically be limited to a search for felt-tip pens and user 20 may introduce additional desired search criteria (such as blue ink and medium tip). Therefore, if a product database 32 searched includes product data relating to a variety of writing utensils, a search of product database 32 may be automatically limited by GCD 42 to only include felt-tip pens within that product database 32. Buyer 20 may also identify additional product attribute values and/or seller attribute values as additional search criteria.

When GCD 42 has performed a search of the product databases 32 identified by a pointer or pointers associated with a class that user 20 has selected (or that has been automatically selected), GCD 42 may return product data associated with one or more products matching the search criteria. GCD 42 may integrate the product data resulting from the search into directory structure 44 so that the data appears to user 20 as being part of GCD 42. GCD 42 may alternatively present the results of the search in any other appropriate manner. Each product resulting from the search may be an object which is unique instance of the class in which user 20 is searching. Furthermore, each such object (and its location) may be uniquely identified using a numbering scheme corresponding to directory structure 44.

In summary, a user 20 may search for a product matching certain product attribute values using GCD 42 and thus eliminate or reduce the need for user 20 to individually search numerous product databases 32 to find the desired product. GCD 42 provides access to product data relating to these numerous products using directory structure 44, which organizes products using a hierarchical, object-oriented classification system. User 20 may navigate or search directory structure 44 to find a particular classification of products and various information associated with the products within this classification, initiate a search of product databases 32 including product data relating to a product, and then communicate with an appropriate product database 32 through GCD server 40 or otherwise. Such access to vast numbers of products is provided without the requirement that all data about the products and/or sellers be stored in a global database. Instead, this data may be stored in product databases 32 that can be readily accessed using GCD 42.

Figure 3:
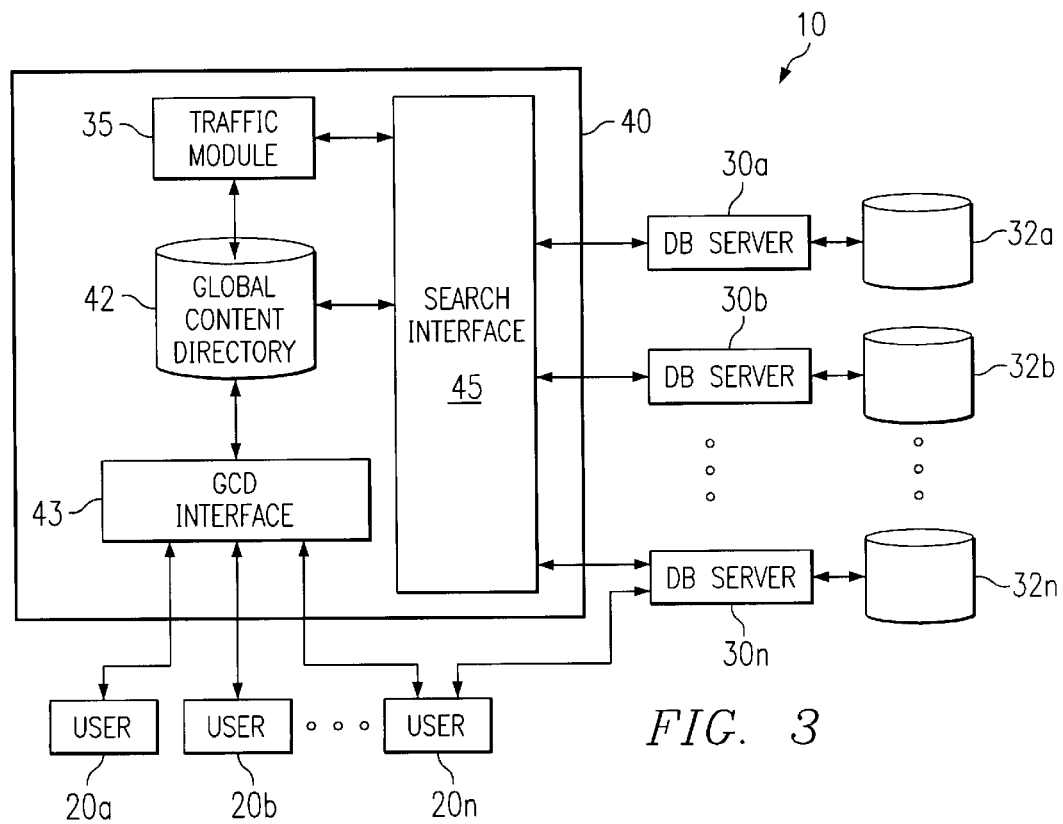
FIG. 3 illustrates an example electronic commerce system in further detail.

FIG. 3 illustrates an example e-commerce system 10 in further detail. As described above, numerous users 20 and product databases 32 may be coupled to GCD server 40 using network 12. Users 20 may access server 40 using a web browser or in any other appropriate manner and server 40 may provide users 20 with access to GCD 42 using a web server or in any other appropriate manner. Although GCD 42 is shown as being internal to GCD server 40, GCD 42 may be internal or external to GCD server 40, as described above. GCD server 40 may also include hardware and/or software for implementing one or more GCD interfaces 43. A user 20 may access server 40 and use a GCD interface 43 to search or navigate GCD 42 and/or product databases 32. Information may be communicated between users 20, product databases 32, and GCD 42 using hypertext transport protocol (HTTP), extensible markup language (XML), simple object access protocol (SOAP), or any other suitable communication technique. Each user 20 may be issued a unique identifier so that the participants in a transaction facilitated by GCD 42 may be identified. Each user 20 may also be assigned a role with respect to a transaction.

In an example transaction, a user 20 may access a GCD interface 43 and perform a search of GCD 42. GCD interface 43 may allow user 20 to both navigate or "browse" the classes of GCD 42 and to search for a particular class or classes. For example, user 20 may either navigate GCD 42 to find a class into which pens are categorized or user 20 may search GCD 42 for class names including the word "pen." Any other suitable methods for identifying a particular class may also be used. When user 20 has located the appropriate class for the product user 20 desires, user 20 may then request a listing of products in that class matching certain product attribute values. For example, if user 20 is browsing felt-tip pens class 60*b*, user 20 may request all products in class 60*b* (felt-tip pens) that have red ink and a fine tip and that are sold by a seller located in the United States.

A search interface 45, or any other appropriate component of GCD server 40, may facilitate such a request by searching or requesting searches of product databases 32 identified by one or more pointers associated with felt-tip pens class 60*b*, as described above. Search interface 45 may provide user 20 a search form in which to enter one or more search criteria. The types of search criteria that may be used may be identified in the search form or user 20 may be allowed to perform a general search of product databases 32 for certain terms. For example, search interface 45 may provide user 20 with a search form tailored for class 60*b* that includes fields where user 20 can specify a desired ink color, tip thickness, or any other appropriate product-related or seller-related criteria. In one embodiment, the fields of the search form correspond to some or all of the product attributes within the product ontology and/or seller attributes within the seller ontology corresponding to the product class that has been selected, and user 20 may enter values for the product attributes and seller attributes in the corresponding search form fields. In lieu of a search form, search interface 45 may instead provide a single field where user 20 can enter in desired search terms, such as "red" and "fine" (multiple search terms may be entered using Boolean operators or any other appropriate technique).

Search interface 45, or any other appropriate component of GCD server 40, may also facilitate search requests by accessing a user profile for user 20 containing information compiled from previous search requests made by user 20, previous e-commerce transactions involving user 20, or other events or actions on the part of user 20. For example, a user profile may contain a list of sellers matching seller attribute values that user 20 may have had success dealing with in the past. Such a list may be compiled from the results of previous searches by user 20. Search interface 45 may access the profile for user 20 for any suitable purpose. In one embodiment, search interface 45 may access the profile for user 20 to automatically generate search criteria, such as product attribute values and/or seller attribute values, for a search. Search interface 45 may also access the profile for user 20 to limit its search for products matching product attribute values provided by user 20 (or generated automatically) to product databases 32 associated with sellers known to match seller attribute values that user 20 may desire.

Based on search criteria provided by user 20 or automatically generated, search interface 45 may communicate a query to the appropriate product database(s) 32 requesting that product databases 32 each return a listing of all products (including associated product data and/or seller data) that meet the search criteria. Product databases 32 may also return data relating to attribute values that were not included in the search criteria. For example, product databases 32 may return a price and availability of products that meet the search criteria even if price and availability were not search criteria. The responses to the queries of product databases 32 may be displayed to user 20 in any appropriate manner. For example, the products may be listed in order of relevance to the search criteria according to any suitable matching criteria. Furthermore, GCD 42 may reorder the product listing based on a request from user 20. For example, user 20 may request that the matching products be listed in order from least expensive to most expensive. Alternatively, the search results may be communicated directly to user 20 from product databases 32.

User 20 may select a product from the product listing to indicate a desire to initiate a transaction regarding the product, such as a purchase of the product. On such a selection, GCD 42 may communicate a repository identifier (RID) identifying the selected seller and a globally unique identifier (GUID) for the product to user 20. For example, an RID may be the network address (such as an IP address) of a seller network node or may be associated with the network address in a table (in which case GCD 42 may use the RID to look up the associated network address and then communicate the network address to user 20). User 20 may access the seller using the RID (or network address) and request a transaction regarding the product using the GUID. GCD 42 may even provide a link including a URL of a web site associated with the seller or may provide another appropriate method for user 20 to be connected to seller.

A benefit of system 10 is that it allows users 20 to search for and quickly locate product data by performing one search at one location. But in order for a user 20 to quickly locate desired product data, system 10 needs to operate smoothly and efficiently. The time required to search for and locate product data may increase during high bandwidth traffic periods and when a number of users 20 are seeking product data about the same or related products. The increased time required to perform a search negatively affects the efficiency of system 10. Users 20 seeking product data about the same or related products increases search time because of the hierarchical structure and associated pointers of GCD 42 and because of how the product data is stored in product databases 32.

Each product class in GCD 42 includes one or more associated pointers that identify product data in a product database 32. In particular embodiments, product databases 32 may each contain the same product data, but GCD server 40 may allocate the associated pointers to product databases 32 from GCD 42 so that not all of the product data stored in each product database 32 is identified by an associated pointer. For instance, product databases 32a through 32n may each contain the same product data including, for example, product data for electronics class 64, industrial class 66, and pens class 58 (it should be noted that product databases 32 may also include data that is not common to all the product databases 32). The associated pointers for electronics class 64 may identify the electronics product data stored in product database 32a, the associated pointers for industrial class 66 may identify the industrial product data stored in product database 32b, and the associated pointers for pen class 58 may identify the pens product data stored in product database 32n. In this configuration, the electronics product data and industrial product data in product database 32n lays dormant and unused while the pen product data and industrial product data in product database 32a lays dormant and unused and the pen product data and electronics product data lays dormant and unused in product database 32b. So when user 20a uses GCD 42 to navigate to pen class 58 to perform a search for product data regarding pens, the associated pointers for pen class 58 identify the pen product data in product database 32n and the search results and subsequent product data that user 20a views are from product database 32n even though the pen product data is also stored in product databases 32a and 32b. The same holds true for electronics product data and industrial product data in that when a user 20 searches for electronics product data, the electronics product data user 20 views is from product database 32a and any industrial product data user 20 views is from product database 32b.

The configuration of product databases 32 described above may lead to bottle-necks or slow downs at particular product databases 32 associated with popular products. For example, multiple electronics manufacturers may release new electronics, such as televisions and stereos, around the same time. Users 20 may be aware of this and a large number of users 20 may access system 10 in order to search and view product data for the new electronics. Because the associated pointers for electronics class 64 in the above example identify product data in product database 32a, the majority of users 20 on system 10 will be trying to access the same electronics product data from product database 32a. Because so many users are attempting to access product database 32a, this may create a bottle-neck at product database 32a and product database 32a may suffer poor performance and become a weak link for system 10. The effects of the bottle-neck may include slow searching and access times for product data in product database 32a as well as for other product databases 32. Even users 20 not seeking electronics product data from product database 32a may notice an overall slow down in the operation of system 10 due to the bottle-neck at product database 32a.

A solution to the bottle-neck slow down problem is traffic module 35. Although traffic module 35 is shown as being internal to GCD server 40, traffic module may be internal or external to GCD server 40. Traffic module 35 serves to solve the bottle-neck and slow down problems by tracking the traffic levels through the product classes and reassigning the pointers from product classes to product databases 32 based on the traffic levels for each product class. Reassigning the pointers allows traffic module 35 to shift the load on product databases 32.

Traffic module 35 captures information when a user 20 performs a search of GCD 42 using search interface 45. The information that traffic module 35 captures includes the product class from which the search was performed, the search criteria used to search the product class, and the number of times each product database 32 is accessed by users 20 performing a search for product data. The ability to track the search criteria allows for traffic module 35 to provide semantic traffic monitoring by monitoring the words used as search criteria. For example, traffic module 35 may capture the product class from which a user 20 searches GCD 42 for product data and the search criteria used to search GCD 42. For each product class, traffic module 35 keeps track of the number of searches performed from that product class. And for each product class, traffic module 35 keeps track of the search criteria used to search the product class. Traffic module 35 uses the number of times users 20 perform searches from each product class to arrive at a numeric value or traffic level for each product class. For example, user 20a may be interested in staplers and perform a search of product data using desk supplies class 54. When user 20a performs this search, traffic module 35 will note that a search was performed from desk supplies class 54 and thereby update the traffic level for desk supplies class 54 by a given increment. User 20a may also be interested in electronics and therefore perform a search for product data using electronics class 64. When user 20a performs this search, traffic module 35 captures this and updates the traffic level for electronics class 64 by a given increment. User 20b may also be interested in desk supplies and initiate a search of product data using desk supplies class 54 and when user 20b does this, traffic module 35 will again update the traffic level for desk supplies class 54 by the given increment. The traffic level for desk supplies class 54 will incorporate the searches performed by users 20a and 20b of desk supplies class 54. Traffic module 35 tracks, calculates, and updates the traffic levels for every product class.

In addition to tracking and calculating the traffic level for each product class, traffic module 35 may also track and calculate traffic levels up directory structure 44 from sub-classes to parent classes to account for the hierarchical structure of GCD 42. For example, parent class pens class 58 includes sub-classes of ball-point pen class 60a, felt-tip pen class 60b, rollerball pen class 60c, and calligraphy pen class 60n. Traffic module 35 will track and calculate traffic levels for each pen sub-class 60a through 60n. But traffic module 35 may also track and calculate traffic levels for parent pen class 58. Traffic module 35 may take the traffic levels for each pen subclass 60 and merge them to into one traffic level and add that value to the traffic level value traffic module 35 already has for pen class 58 from the searches performed from pen class 58. This allows for more complete traffic level values for all product classes and especially for parent classes.

Often times users 20 will be very specific in what products they are searching for. For instance, user 20a may be interested in only rollerball pens and therefore navigate to rollerball pen class 60c to perform a search for product data for rollerball pens. On the other hand, user 20b may not have as specific requirements and may be interested in both ball-point and rollerball pens and therefore perform a product data search from pen class 58. Rollerball pen class 60c is a sub-class of parent pen class 58 and although user's 20a search was not performed from pen class 58, the search from rollerball pen class 60c may include product data associated with pen class 58. Therefore, a search of rollerball pen class 60c affects the traffic of pen class 58. Traffic module 35 understands the relationship between parent classes and sub-classes and therefore may merge the traffic of sub-classes and add this merged traffic level value to the traffic level for the parent class calculated from tracking the number of searches initiated from the parent class to arrive at a total traffic level for parent classes. So in the example above, traffic module 35 would calculate the traffic level for pen class 58 by tracking the number of searches initiated from pen class 58 as well as merging the traffic levels for each sub-class 60 and adding together these two values to get the traffic level for pen class 58. In addition, traffic module 35 also has the ability to view traffic levels going forward from parent class to sub-classes. For instance, at pens class 58 traffic module 35 can determine the traffic level for pen class 58 as well as each pen sub-class 60a through 60n which enables traffic module 35 to better understand traffic levels and if a bottle-neck is occurring anywhere.

The goal for system 10 is to operate smoothly and have close to equal traffic levels for each product database 32. Traffic module 35 uses the traffic levels for the product classes to dynamically balance the loads on product databases 32 to achieve equal traffic across product databases 32. Traffic module 35 reassigns the associated pointers from one product database 32 to another product database 32 when the load on one or more product databases 32 becomes unbalanced. For instance, referring to the example above in which electronics class 64 is associated with product database 32a, industrial class 66 is associated with product database 32b, and pens class 58 is associated with product database 32n, there is a bottle-neck at product database 32a because of the large number of users 20 seeking product data regarding electronics. Traffic module 35 tracks the traffic levels for electronics class 64, industrial class 66, and pens class 58. Periodically, traffic module 35 updates the current traffic levels for each product class and analyzes the traffic levels to determine if any product class and subsequently any product databases 32 are experiencing very high traffic which may lead to or may already be causing a bottle-neck. In examining the traffic level for electronics class 64, traffic module 35 may notice that electronics class 64 and consequently product database 32a is experiencing very high traffic and usage likely to lead to a bottle-neck and/or an overall slow down of system 10.

Traffic module 35 recognizes a given traffic level that lead to a bottle-neck or slow down and will reassign the pointers in GCD 42 to prevent the bottle-neck or slow down and thereby keep traffic across product databases 32 balanced. For example, the traffic level at electronics class 64 may be at a high level, while the traffic level for industrial class 66 may be at a low level and the traffic level at pen class 58 is at a moderate level. Because the traffic level at electronics class 64 is high (for example, above a specified threshold), a bottle-neck may exist at product database 32a which slows down access to electronics product data as well as the entire system 10. Product database 32b is being underutilized since the traffic level for industrial class 66 is low and below the optimal level. Traffic module 35 recognizes the disparity and unbalance across product databases 32 and reassigns the associated pointers in GCD 42 to achieve a balance across product databases 32. Because electronics class 64 and product database 32a are over-extended, traffic module 35 may reassign some of the associated pointers for electronics class 64 from product database 32a to product databases 32b. Traffic module 35 may not alter the associated pointers for industrial class 66 and pens class 58 because industrial class 66 is under-utilized and pen class 58 is at a low traffic level.

Reassigning some of the associated pointers for electronics class 64 allows GCD 42 to gather electronics product data from both product databases 32a and 32b thereby allowing product database 32a to not be the only source for electronics product data and alleviating the bottle-neck at product database 32a. Therefore when users 20 perform a search from electronics class 64, users 20 will view electronics product data from product databases 32a and 32b instead of just product database 32a. This decreases the load on product database 32a while increasing the load on product database 32b. Since product database 32b was under utilized, the increased load on product database 32b from electronics class 64 brings product database 32b closer, if not to, preferred traffic levels while the decreased load on product database 32a caused by a portion of the electronics class 64 traffic being diverted to product database 32b brings product database 32a closer to a preferred traffic level.

The ability to dynamically reassign pointers and balance the load across product databases 32 stems from the structure of GCD 42 and that fact that product databases 32 may contain common product data with different portions of the product data in each product database being accessible at any given time by GCD 42. An advantage of having common product data stored in multiple product databases 32 but only having a portion of the product data accessible to users 20 is that the content is more localized because each product database 32 typically produces the same product data throughout a typical day of operation for system 10. The localized product data allows database servers 30, associated with product databases 32, to take advantage of caching memory features using volatile memory storage to further increase the speed of operation for system 10.

Using the example above, when user 20 performs a search from pens class 58, search interface 45 performs a search for product data in product database 32n through database server 30n. Database server 30n receives the search query from search interface 45 and searches and locates the desired product data from product database 32n. Once database server 30n locates the correct product data, database server 30n communicates the product data to search interface 45 and user 20 views the search results or product data in GCD 42. Since product database 32n is only supplying product data to GCD 42 for pens class 58 instead of all product classes, the accessible product data on product database 32n is limited to pens product data and is therefore more localized. There is a greater probability that various users 20 will be requesting and reusing pens product data that other users 20 have already requested and used. Reusing of the localized product data allows system 10 to take advantage of the cache features of database servers 30. For instance, user 20a performs a search from pens class 58 for ballpoint pens and felt-tip pens having blue ink. Search interface 45 communicates the search query and contacts database server 30n. Database server 30n searches and locates the desired pens product data from product database 32n and communicates the product data back to search interface 45. But when database server 30n locates the desired pens product data for ballpoint pens and felt-tip pens, the product data may be stored in its cache or volatile memory.

At a later time, user 20b performs a search from ball-point pen class 60a for ball-point pens having blue ink. Search interface 45 communicates this search query to database server 30n. Database server 30n does not have to search product database 32n for the desired product data since database server 30n has stored in its cache memory the desired product data for ball-point blue ink pens from the search performed earlier by user 20a. Therefore, database server 30n communicates the desired product data back to search interface 45 without having to take the time to search product database 32n. By having the product data stored in cache memory and not having to search product database 32n for the product data, the desired product data is located more quickly and the overall efficiency and speed of system 10 increases. If the product data was not localized across product databases 32 and each product database 32 provided access to product data for all product classes, then database servers 30 would not be able to take advantage of the cache features because the product data accessed for each product database 32 would be varied, less likely to be reused, and therefore product data stored in cache would generally not be reused.

Because traffic module 35 monitors the traffic levels for the product classes and product databases 32 and dynamically balances the traffic to each product database 32 based on current traffic levels, there is less need for traffic module 35 to predict traffic levels in advance in an attempt to keep the traffic levels balanced. But traffic module 35 may still use predefined traffic patterns and levels in an attempt to balance the load and intelligently allocate product data across product databases 32 in advance for predictable situations (such as the difference between day and night usage). For example, certain product data may be more active during different times of the day and overall activity may decrease during the evening and night hours. Traffic module 35 may allocate the product data to reflect these trends. As another example, traffic levels in pen class 58 may be very high during regular working hours and then drop off at night while electronics class 64 traffic levels may be higher at night than during the day. This may be due to the fact that the majority of users 20 searching for pens are searching for pens for the workplace and therefore perform pen searches during the day. Electronics product data may be less workplace-related and thus users 20 may wait until they are home from work or at least until the work day has ended to search for electronics product data. Therefore, traffic module 35 may intelligently allocate the associated pointers to particular product databases 32 for pens class 58 and electronics class 64 to account for the high pen traffic and low electronics traffic during the day and the high electronics traffic and low pen traffic during the evening and night.

In addition, traffic module 35 may also dynamically redirect pointers in the same product class based upon the search criteria entered by user 20 to allow for semantic redirection. For instance, automotive class 65 includes pointers to product data for automobiles in product databases 32. Some users 20 may be interested in American cars and perform a search from automotive class 65 using "American" as one of the search criteria while other users 20 may be interested in Japanese cars and perform a search from automotive class 65 using "Japanese" as one of the search criteria. But if a large number of users 20 are performing searches from automotive class 65 using "Japanese" as a search term and a low number of users 20 are using "American" as a search term, traffic module 35 may recognize this and redirect the pointers within automotive class 65 to different product databases 32 to account for the difference in the number of users 20 performing searches using "Japanese" and number using "American." Traffic module 35 may redirect some of the pointers within automotive class 65 from identifying product data for American cars to identifying product data for Japanese cars to adequately handle the large number of searches performed from automotive class 65 using "Japanese" as a search criteria. Because of the semantic traffic monitoring capabilities, this invention is not limited to product classes, product databases, and product data. Traffic module 35 may use semantic traffic monitoring to track the words or search criteria used to search and redirect pointers based on the search criteria.

Figure 4:
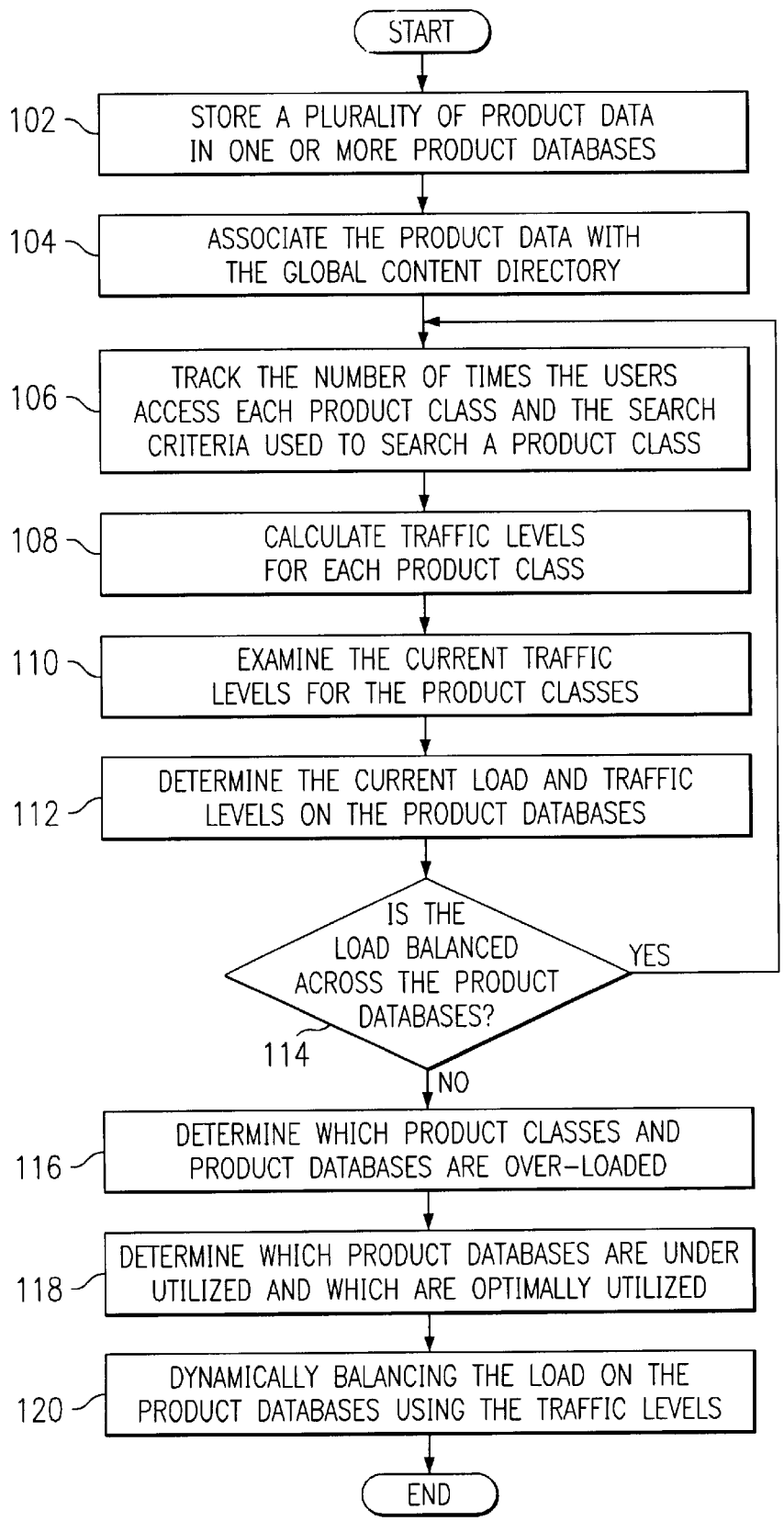
FIG. 4 illustrates an example method for dynamic load balancing using semantic traffic monitoring.

FIG. 4 illustrates an example method for dynamic load balancing using semantic traffic monitoring. The method begins at step 102, where product data is stored in product databases 32. Product data associated with multiple product classes may be stored in each product database 32 so that multiple product database 32 contain the same product data. At step 104, GCD server 40 associates the product data stored in product databases 32 with the product classes in GCD 42 by creating one or more pointers to the product data and associating the pointers with one or more product classes. These pointers may be created at once or periodically as product databases 32 are incorporated into system 10. Even though the same product data may be stored in multiple product databases 32, the associated pointers for the product classes may only identify particular product data in each product database 32 so that only a portion of the product data is accessible from each product database 32. For instance, product database 32a may contain product data associated with multiple product classes but the pointers that identify the product data in product database 32 may only be associated with electronics class 64. Therefore, in this example, only electronics product data may be accessible from product database 32a.

As users 20 begin to use system 10, at step 106 traffic module 35 tracks the number of times users 20 access each product class. Traffic module 35 also tracks the search criteria used by each user 20 when performing a search from a product class. Traffic module 35 captures information every time a user 20 performs a search of GCD 42 using search interface 45. Traffic module 35 captures the product class from which a user 20 uses GCD 42 to search for product data and the search criteria user 20 entered to search the product class. For each product class, traffic module 35 keeps track of the number of searches performed from that product class as well as search criteria used to search the product class. At step 108, traffic module 35 uses the number of times users 20 perform searches from each product class to determine the traffic levels for each product class and the search criteria used to search each class to monitor traffic within each product class. When user 20 performs a search, traffic module 35 notes that a search was performed from a product class and thereby updates the traffic level for the product class by a given increment. Traffic module 35 tracks, calculates, and updates the traffic levels for every product class.

At given intervals, traffic module 35 examines the current traffic levels for all the product classes at step 110. Traffic module 35 may examine the current traffic levels periodically (such as every minute, every five minutes, every fifteen minutes, or for any other appropriate time interval) when the levels reach a certain quantity or at any other appropriate time. Traffic module 35 accomplishes this by examining the traffic levels it has calculated for each product class as well as merging together the traffic levels for the product subclasses to arrive at the traffic levels for the parent product classes, as described above. Once traffic module 35 has the current traffic levels for each product class, at step 112 traffic module 35 examines which product databases 32 are identified by which associated pointers for the product classes to determine the current traffic levels and loads for each product databases 32. At step 114, traffic module 35 examines product databases 32 to determine if the load across product databases 32 is balanced. The load will not be balanced if any product databases 32 have excessive traffic levels and therefore likely to cause or have already causing a bottle-neck or a slow down of system 10. If the loads on product databases 32 are balanced at step 114, then the method returns to step 106 wherein traffic module 35 continues to track the number of times users 20 perform searches from the product classes and therefore calculate traffic levels for the product classes.

If the load across product databases 32 is not balanced at step 114, then at step 116 traffic module 35 determines which product databases 32 are overloaded. For example, traffic module 35 may determine which product databases 32 are overloaded by determining which product classes have excessive levels over a selected threshold. Once traffic module 35 determines which product classes have excessive traffic levels, traffic module 35 determines which product databases 32 are identified by the associated pointers in the overloaded product classes and whether these product databases 32 are overloaded. To balance the load across product databases 32, traffic module 35 also determines which product databases 32 are under-utilized and moderately utilized at step 118. Traffic module 35 may determine which product databases 32 are under-utilized by looking for low traffic levels for product classes and determines which product databases 32 are moderately utilized by looking at the traffic levels for product classes that allow the associated product database 32 to operate at a preferred efficiency level. Traffic module 35 requires knowledge of which product databases 32 are underutilized and moderately utilized so that traffic module 35 may identify where it can shift some of load from the overloaded product databases 32 to balance the load across all product databases 32.

Once traffic module 35 determines which product databases 32 are overloaded, under-utilized, and moderately utilized, traffic module 35 may begin to dynamically balance the loads across all product databases 32 at step 120. Traffic module 35 balances the load across product databases 32 by reassigning the associated pointers for the product classes to different or additional product databases 32 so that some of the load or traffic for an overloaded product database 32 is redirected to an under utilized product database 32. For example, traffic module 35 may determine that the traffic levels for electronics class 64 are too high thereby causing product database 32a to be overloaded and the traffic levels for industrial class 66 are low causing product database 32b to be under-utilized. Traffic module 35 determines that the load across product databases 32 is not balanced and traffic module 35 acts to balance the load. Traffic module 35 dynamically balances the load by reassigning the pointers for electronics class 64 from product database 32a to product databases 32a and 32b. Therefore, the load for electronics class 64 is spread across product databases 32a and 32b thereby decreasing the load on product database 32a to a level closer to the optimal level and increasing the load on product database 32b to a level closer to the optimal level. Once traffic module 35 balances the load the method ends.

The method discussed in FIG. 5 is merely one example method for dynamic load balancing using semantic traffic monitoring. The method may be repeated at a given interval so that traffic module 35 may constantly be checking to determine if the load is balanced or if the load needs to be rebalance. The steps may be performed in a different order than presented above and certain steps may not be performed.

Although the present invention has been described with several embodiments, divers changes, substitutions, variations, alterations, and modifications may be suggested to one skilled in the art, and it is intended that the invention encompass all such changes, substitutions, variations, alterations, and modifications falling within the spirit and scope of the appended claims.

What is claimed is:

1. An electronic commerce system for dynamic load balancing, the system comprising:

one or more product databases each operable to store product data;

a global content directory including a plurality of product classes organized in a hierarchy, each product class categorizing a plurality of products and associated with one or more attributes of the products categorized in the product class, at least one of the product classes having one or more associated pointers that identify one or more of the product databases;

a search interface associated with the global content directory, the search interface operable to communicate a search query to the product databases to search the product data stored in the product databases identified by one of the pointers; and a traffic module operable to:
monitor one or more traffic levels associated with each of one or more of the product classes; and
dynamically balance searches of the product databases based on the traffic levels.

2. The system of claim 1 wherein one or more of the pointers identify particular product data stored in the product databases.

3. The system of claim 1 wherein:
a plurality of the product databases store common product data; and
the traffic module dynamically balances searches of the product databases by changing the product databases identified by one or more of the pointers to one or more different product databases that also store the data that is relevant to the pointer, the dynamic balancing based upon the traffic levels associated with searches initiated using the pointers.

4. The system of claim 3 wherein the traffic levels are based on any search from a product class by a user of the global content directory initiated through a pointer.

5. The system of claim 3 wherein the traffic levels are based on specific product data that is searched by the user.

6. The system of claim 1 wherein the traffic module updates the traffic levels for a particular product class every time the user accesses a particular product class.

7. The system of claim 1 wherein the traffic module updates the traffic levels for a particular product class every time the user performs a search from a particular product class.

8. The system of claim 1 wherein the traffic module is further operable to:
monitor the searches of the product databases for particular subsets of product data being searched by the user; and
update the traffic levels each time the user searches the particular subset of data.

9. The system of claim 1 further comprising one or more database servers associated with the product databases, the database servers operable to store frequently requested product data from the product databases with which the database servers are associated, the database servers operable to communicate the stored product data in response to a search query without accessing the associated product database.

10. The system of claim 1 wherein the search query comprises desired values, specified by the user, for one or more of the product attributes with the selected product class.

11. A method for dynamically balancing load on an electronic commerce system, the method comprising:

associating product data stored in one or more product databases with a global content directory, the global content directory including a plurality of product classes organized in a hierarchy, each product class categorizing a plurality of products and associated with one or more attributes of the products categorized in the product class, at least one of the product classes having one or more associated pointers that identify one or more of the product databases;

monitoring one or more traffic levels associated with each of one or more of the product classes; and dynamically balancing searches of the product databases based on the traffic levels.

12. The method of claim 11 wherein one or more of the pointers identify particular product data stored in the product databases.

13. The method of claim 11 wherein a plurality of the product databases store common product data.

14. The method of claim 13 wherein dynamically balancing searches of the product databases comprises changing the product databases identified by one or more of the pointers to one or more different product databases that also store the data that is relevant to the pointer, the dynamic balancing based upon the traffic levels associated with searches initiated using the pointers.

15. The method of claim 14 wherein the traffic levels are based on any search from a product class by a user of the global content directory initiated through a pointer.

16. The method of claim 14 wherein the traffic levels are based on specific product data that is searched by the user.

17. The method of claim 11 wherein monitoring one or more traffic levels associated with each of one or more of the product classes comprises updating the traffic levels for a particular product class every time the user accesses a particular product class.

18. The method of claim 11 wherein monitoring one or more traffic levels associated with each of one or more of the product classes comprises updating the traffic levels for a particular product class every time the user performs a search from a particular product class.

19. The method of claim 11 further comprising:
monitoring the searches of the product databases for particular subsets of product data being searched by the user; and
updating the traffic levels each time the user searches the particular subset of data.

20. The method of claim 11 further comprising:
storing frequently requested product data from the product databases in one or more database servers; and
communicating the stored product data in response to a search query without accessing the associated product database.

21. The method of claim 11 wherein the search query comprises desired values, specified by the user, for one or more of the product attributes with the selected product class.

22. Software for dynamically balancing load on an electronic commerce system, the software embodied in a computer-readable medium and operable to:
associate product data stored in one or more product databases with a global content directory, the global content directory including a plurality of product classes organized in a hierarchy, each product class categorizing a plurality of products and associated with one or more attributes of the products categorized in the product class, at least one of the product classes having one or more associated pointers that identify one or more of the product databases;

monitor one or more traffic levels associated with each of one or more of the product classes; and dynamically balance searches of the product databases based on the traffic levels.

23. The software of claim 22 wherein one or more of the pointers identify particular product data stored in the product databases.

24. The software of claim 23 wherein a plurality of the product databases store common product data.

25. The software of claim 24 wherein dynamically balancing searches of the product databases comprises changing the product databases identified by one or more of the pointers to one or more different product databases that also store the data that is relevant to the pointer, the dynamic balancing based upon the traffic levels associated with searches initiated using the pointers.

26. The software of claim 25 wherein the traffic levels are based on any search from a product class by a user of the global content directory initiated through a pointer.

27. The software of claim 25 wherein the traffic levels are based on specific product data that is searched by the user.

28. The software of claim 22 wherein monitoring one or more traffic levels associated with each of one or more of the product classes comprises updating the traffic levels for a particular product class every time the user accesses a particular product class.

29. The software of claim 22 wherein monitoring one or more traffic levels associated with each of one or more of the product classes comprises updating the traffic levels for a particular product class every time the user performs a search from a particular product class.

30. The software of claim 22 further operable to:

monitor the searches of the product databases for particular subsets of product data being searched by the user; and update the traffic levels each time the user searches the particular subset of data.

31. The software of claim 22 further operable to:

store frequently requested product data from the product databases in one or more database servers; and communicate the stored product data in response to a search query without accessing the associated product database.

32. The software of claim 22 wherein the search query comprises desired values, specified by the user, for one or more of the product attributes with the selected product class.

33. A system for dynamically balancing load on an electronic commerce system, the method comprising:

means for associating product data stored in one or more product databases with a global content directory, the global content directory including a plurality of product classes organized in a hierarchy, each product class categorizing a plurality of products and associated with one or more attributes of the products categorized in the product class, at least one of the product classes having one or more associated pointers that identify one or more of the product databases;

means for monitoring one or more traffic levels associated with each of one or more of the product classes; and means for dynamically balancing searches of the product databases based on the traffic levels.

* * * * *